United States Patent
Miyoshi (10) Patent No.: US 8,646,498 B2
(45) Date of Patent: Feb. 11, 2014

(54) PNEUMATIC TIRE WITH TREAD HAVING SHALLOWER NOTCHED LUG GROOVES

(75) Inventor: Masaaki Miyoshi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/454,886

(22) Filed: Apr. 24, 2012

(65) Prior Publication Data

US 2013/0146192 A1 Jun. 13, 2013

(30) Foreign Application Priority Data

Dec. 7, 2011 (JP) ................................. 2011-267994

(51) Int. Cl.
*B60C 11/12* (2006.01)
*B60C 11/13* (2006.01)

(52) U.S. Cl.
USPC ............ 152/209.15; 152/209.21; 152/209.22; 152/209.24; 152/209.25; 152/209.28; 152/DIG. 3

(58) Field of Classification Search
USPC ............... 152/209.2, 209.15, 209.18, 209.21, 152/209.22, 209.24, 209.25, 209.28, DIG. 3
See application file for complete search history.

(56) References Cited

U.S. PATENT DOCUMENTS

| | | | |
|---|---|---|---|
| 2003/0019555 A1* | 1/2003 | Nakagawa | 152/209.18 |
| 2004/0112494 A1* | 6/2004 | Colombo et al. | 152/209.18 |
| 2004/0118494 A1* | 6/2004 | Liederer | 152/209.3 |
| 2009/0320981 A1* | 12/2009 | Matsumoto | 152/209.8 |
| 2010/0206446 A1* | 8/2010 | Oizumi | 152/209.18 |
| 2012/0006456 A1 | 1/2012 | Koshino | |

FOREIGN PATENT DOCUMENTS

| | | | |
|---|---|---|---|
| JP | 03-032907 A | * | 2/1991 |
| JP | 04-212604 A | * | 8/1992 |
| JP | 2001-039123 A | | 2/2001 |
| JP | 2002-283812 A | | 10/2002 |
| JP | 2006-347459 A | | 12/2006 |
| JP | 2008-222074 A | | 9/2008 |
| JP | 2009-090680 A | | 4/2009 |
| WO | WO-2010/084988 A1 | | 7/2010 |

OTHER PUBLICATIONS

Translation for Japan 04-212604 (no date).*

* cited by examiner

*Primary Examiner* — Steven D Maki (74) *Attorney, Agent, or Firm* — Global IP Counselors (57) ABSTRACT

A pneumatic tire having improved braking performance includes sides and a tread section between the sides. In each of two regions on opposite sides of a tire centerline in the tread section, two circumferential main grooves extend along a tire circumferential direction in a zigzag shape, first lug grooves extend from an inner circumferential main groove to a pattern end, and second lug grooves extend toward the pattern end from the outer circumferential main groove. A wall of the inside circumferential main groove includes wall surfaces with a wall angle varying along the circumferential direction. An outside land section between the main grooves includes a notched lug groove extending in a tire widthwise direction from either the inside or outside main groove and closes within the outside land section. A groove depth of the notched lug groove is shallower than that of the first and second lug grooves.

14 Claims, 4 Drawing Sheets

PNEUMATIC TIRE WITH TREAD HAVING SHALLOWER NOTCHED LUG GROOVES

CROSS-REFERENCE TO RELATED APPLICATIONS

This application claims priority to Japanese Patent Application No. 2011-267994, filed on Dec. 7, 2011, the entire disclosures of Japanese Patent Application No. 2011-267994 are hereby incorporated herein by reference.

BACKGROUND

1. Field of the Invention

The present invention relates to a pneumatic tire having a tread pattern provided in a tread section.

2. Background Information

Studless tires have been used as a winter tire for some time in Europe and other places. The studless tires are expected to exhibit excellent braking performance on snow covered roads and also need to provide excellent braking performance on damp roads (wet roads) where water has collected on the road surface due to melting snow. That is, studless tires are expected to have excellent braking performance on both snow covered road surfaces and wet road surfaces. Various tread patterns have been proposed for such a studless tire.

For example, a studless tire has been proposed that can improve water drainage while ensuring good snow and ice performance (Japanese Laid-open Patent Publication No. 2002-283812). With this studless tire, the tread contact surface only has a plurality of transverse grooves that transversely cross the treads. Each of the transverse grooves is formed by joining together two crosswise grooves. One of the crosswise grooves extends from one tread border toward a tire equator surface, is substantially not slanted with respect to an axial direction of the tire (tire widthwise direction) at least near the tread border, and is slanted with respect to the tire axial direction at a tread middle portion that is closer to the tire equator surface than a portion near the tread border. The other crosswise groove extends from another tread border toward the tire equator surface and is slanted with respect to the tire axial direction at a tread middle portion that excludes at least a portion near the tread border. At the tread middle portion, each of these transverse grooves forms two branch grooves and the tread middle portion. One of the branch grooves slants in a tire rotational direction with respect to a tire rotational axis, and the other branch groove slants in the opposite direction of the tire rotational direction with respect to the tire rotational axis. A column of a plurality of blocks is formed by the branch grooves extending from opposite tread borders being joined together. Assuming the tire width is divided into eight equal parts from one tread border to the other tread border, then a negative ratio (groove area ratio) of a tread middle region comprising two regions of the tread middle portion is set to be smaller than a negative ratio of a tread side region positioned outward of the tread middle region in the tire axial direction. With a tread pattern configured in this manner, water drainage can be improved while also ensuring good snow and ice performance.

SUMMARY

Although the studless tire explained above improves water drainage (wet hydroplaning performance) while ensuring good snow and ice performance (includes braking performance on snow, traction on snow, and evaluation of feeling when braking, starting into motion, driving straight, and cornering on snow), there is a demand for even better braking performance on both snow covered road surfaces and wet road surfaces.

An object of the present invention is to provide a pneumatic tire that uses a tread pattern completely different from the tread patterns of publicly known studless tires and can improve one of a braking performance on snow covered road surfaces and a braking performance on wet road surfaces while at least maintaining the other.

One aspect of the present invention is a pneumatic tire having a tread pattern provided in a tread section. In each of two regions disposed on opposite sides of a tire centerline in the tread section, the tread pattern of the pneumatic tire has two circumferential main grooves, a plurality of first lug grooves, and a plurality of second lug grooves. The two circumferential main grooves are provided side-by-side along a tire widthwise direction, and each of the circumferential main grooves is configured to extend along a tire circumferential direction in a zigzag shape such that it is slanted at a slant angle with respect to the tire circumferential direction and exhibits a position variation in the tire widthwise direction. The first lug grooves are arranged along the tire circumferential direction and configured to extend from an inner circumferential main groove of the two circumferential main grooves, i.e., the circumferential main groove located closer to the tire centerline, so as to be slanted with respect to the tire circumferential direction. At an intermediate portion, each of the first lug grooves becomes slanted with a larger angle with respect to the tire circumferential direction and reaches a pattern end. The second lug grooves are arranged along the tire circumferential direction and configured to extend toward the pattern end from the outer circumferential main groove of the two circumferential main grooves, i.e., the circumferential main groove located more toward an outside of the tire in a tire widthwise direction.

At least one of the second lug grooves is arranged between two of the first lug grooves that are adjacent to each other along the tire circumferential direction. The side wall of the inner circumferential main groove that is located closer to the tire centerline includes a groove-wall-angle varying wall surface configured such that a groove wall angle with respect to a tire radial direction increases as one proceeds in a tire circumferential direction. An outside land section demarcated by the inside circumferential main groove, the outside circumferential main groove, and two of the first lug grooves arranged adjacent to each other in the tire circumferential direction is positioned facing opposite a portion of the groove-wall-angle varying wall surface with the inside circumferential groove disposed in-between.

The outside land section is provided with a notched lug groove that extends in a tire widthwise direction from either the inside circumferential main groove or the outside circumferential main groove and closes in a region within the outside land section. A groove depth of the notched lug groove is shallower than a groove depth of the first lug grooves where they pass by adjacently to the outside land section and shallower than a groove depth of the second lug grooves where they extend from the outside circumferential main groove.

With the pneumatic tire just explained, one of a braking performance on snow covered road surfaces and a braking performance on wet road surfaces can be improved while at least maintaining the other.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
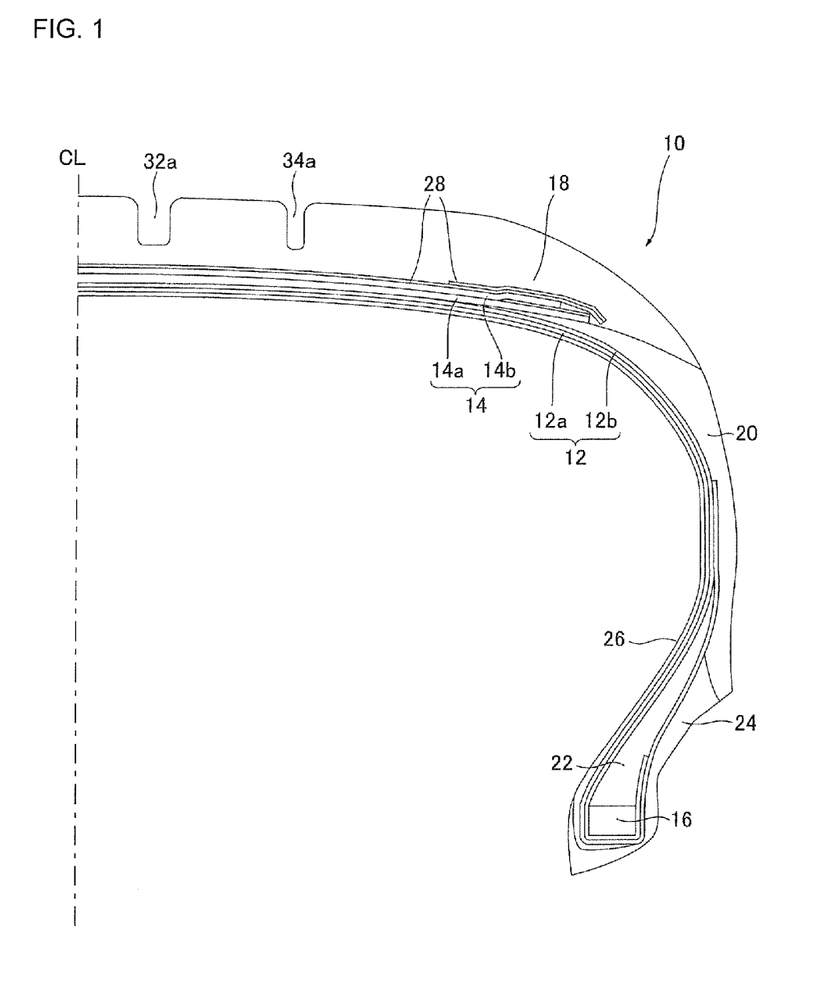
FIG. 1 is a tire cross sectional view of a pneumatic tire according to an embodiment.

A pneumatic tire according to a disclosed embodiment will now be explained. FIG. 1 is a tire cross sectional view of a pneumatic tire (hereinafter called "tire") 10 according to an embodiment. The pneumatic tire 10 is, for example, a tire for a passenger car. A passenger car tire is a tire defined according to Chapter A of the JATMA Yearbook 2010 (standards of The Japan Automobile Tyre Manufacturers Association, Inc.). The tire 10 can also be a small truck tire as defined in Chapter B or a truck tire or bus tire as defined in Chapter C. The numerical values of the dimensions of the pattern elements presented in the explanation that follows are examples of numerical values used in a tire for a passenger car; however, a pneumatic tire according to the present invention is not limited to these numerical values.

In the explanations that follow, a tire circumferential direction refers to a direction in which a tread surface rotates when the tire 10 is rotated about a tire rotational axis, a tire radial direction is a direction extending perpendicularly to the tire rotational axis, and "outward in a radial direction" means away from the tire rotational axis along a radial direction of the tire. A tire widthwise direction refers to a direction parallel to the tire rotational axis, "outward in a tire widthwise direction" means toward either side of the tire 10 away from a tire centerline CL, and "inward in a tire widthwise direction" means toward the centerline CL of the tire 10.

The tire 10 comprises chiefly a carcass ply layer 12, a belt layer 14, and bead cores 16 serving as a framework material and a tread rubber member 18, side rubber members 20, bead filler rubber members 22, rim cushion rubber members 24, and an inner liner rubber member 26 arranged around the framework material. The carcass ply layer 12 includes carcass ply members 12a and 12b that are made of organic fibers covered with rubber and wound between a pair of annular bead cores 16 in a toroidal form. Although the carcass ply layer 12 comprises two carcass ply members 12a and 12b in the tire 10 shown in FIG. 1, it is acceptable for the carcass ply layer 12 to comprise one carcass ply member. The belt layer 14 comprises two belt members 14a and 14b provided on the outward side of the carcass ply layer 12 in the tire radial direction. Each of the belt members 14 is made of steel cords that are arranged slanted at a prescribed angle, e.g., 20 to 30 degrees, with respect to a tire circumferential direction and covered with rubber. The two belt members 14 are arranged layered over and under each other and the lower belt member 14a has a larger dimension in a tire widthwise direction than the upper belt member 14b. The steel cords of the two layered belt members 14a and 14b are arranged in opposing diagonal directions. Thus, the belt members 14a and 14b form crisscrossed layers that suppress expansion of the carcass ply layer 12 caused by the pressure of the air with which the tire is inflated.

The tread rubber member 18 is provided on the radially outward side of the belt layer 14 and the side rubber members 20 are connected to both edge portions of the tread rubber member 18 to form side walls. The rim cushion members 24 are provided on radially inward edges of the side rubber members 20 and contact a rim when the tire 10 is installed. The bead filler rubber members 22 are provided on radially outward sides of the bead cores 16 and arranged to be sandwiched between portions of the carcass ply layer 12 reached before the carcass ply layer 12 winds around the bead cores 16 and portions of the carcass ply layer 12 that are wound around the bead cores 16. The inner liner rubber member 26 is provided on an inner surface of the tire 10 facing a hollow space region that is surrounded by the tire 10 and the rim and serves as a space into which air is filled. Also, the tire 10 further includes a belt cover layer 28 that is made of organic fibers covered with rubber and covers the belt layer 14 from the tire-radial-direction outside of the belt layer 14. It is also possible to provide a sheet member that is made of organic fibers covered with rubber and covers the bead sections. Although the tire 10 has the tire structure just explained, a pneumatic tire according to the present invention is not limited to the tire structure shown in FIG. 1.

Figure 2:
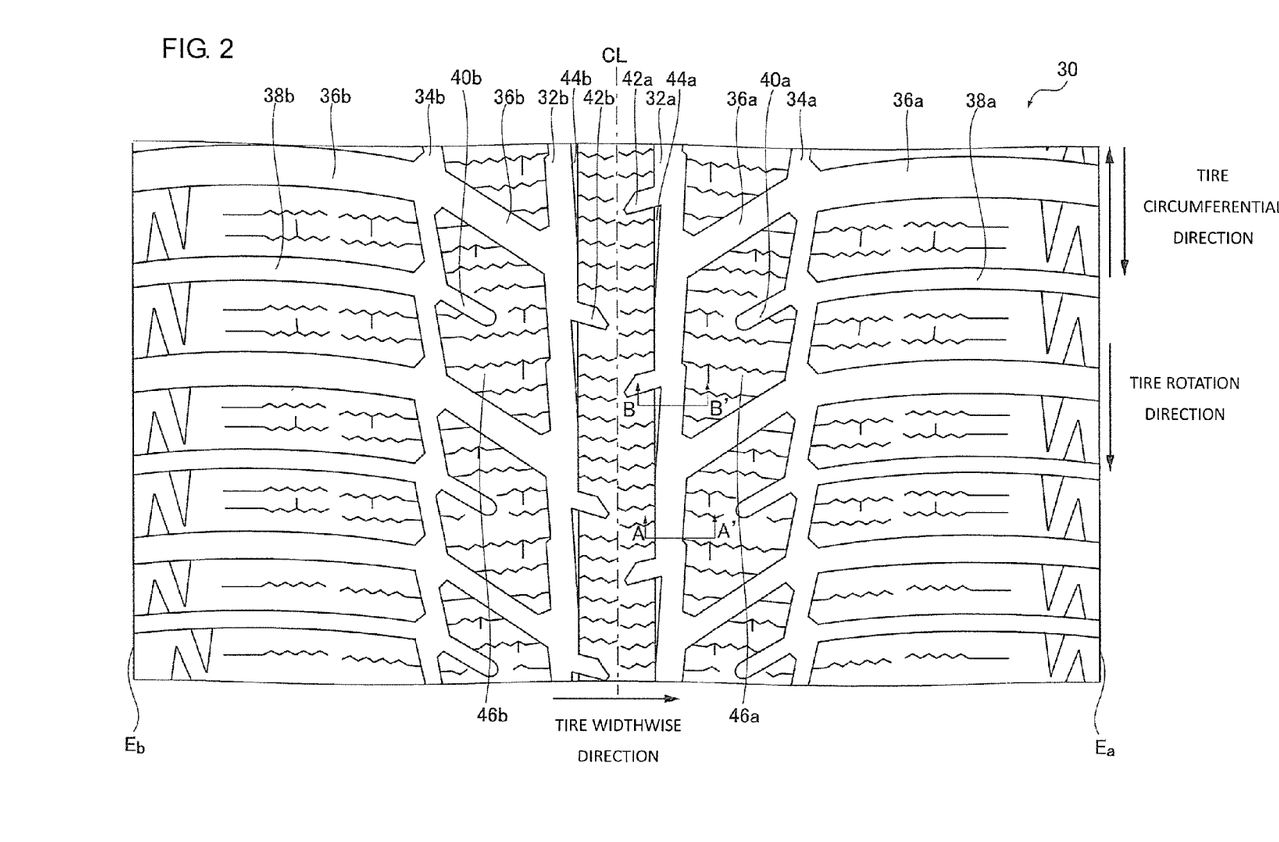
FIG. 2 is a flattened view showing an example of a portion of a tread pattern provided in a tread section of the tire shown in FIG. 1 when the tread pattern is spread onto a flat plane.

FIG. 2 is a flattened view showing an example of a portion of a tread pattern 30 provided in a tread section of the tire 10 shown in FIG. 1 when the tread pattern is spread onto a flat plane. The tread pattern 30 is a pattern having a designated tire rotation direction. Information related to the tire rotation direction is indicated with symbols, letters, numerals, and other markings provided on a surface of a side wall section of the tire 10. When the tire 10 is installed on a vehicle, the rotation direction of the tire is taken into account when the tire 10 is installed on a left or right wheel of the vehicle. Arranged on the left and right sides of the tire centerline CL serving as a reference in the drawings, the tread pattern 30 shown in FIG. 2 has circumferential main grooves 32a, 34a, 32b, and 34b, first lug grooves 36a and 36b, second lug grooves 38a and 38b, notched grooves 40a and 40b, and center lug grooves 42a and 42b. Among the circumferential main grooves 32a, 34a, 32b, and 34b, the circumferential main grooves 32a and 32b positioned more inward in the tire widthwise direction are called inside circumferential main grooves 32a and 32b, and the circumferential main grooves 34a and 34b positioned more outward in the tire widthwise direction are called outside circumferential main grooves 34a and 34b. The tread pattern 30 has the two circumferential main grooves 32a and 34a provided side-by-side along the tire widthwise direction in a region of the tread section located on the right side of the tire centerline CL in the tire widthwise direction in FIG. 2, and has the two circumferential main grooves 32b and 34b provided side-by-side along the tire widthwise direction in a region of the tread section located on the left side in FIG. 2.

The tread section has a center land section arranged between the circumferential main grooves 32a and 32b, outside land sections 46a surrounded by the inside circumferential main groove 32a and the outside circumferential main groove 34a, outside land sections 46b surrounded by the inside circumferential main groove 32b and the outside circumferential main groove 34b, shoulder land sections provided between the outside circumferential main groove 34a and a pattern edge Ea, and shoulder land sections provided between the outside circumferential main groove 34b and a pattern edge Eb. A plurality of sipes configured to combine a wave-like shape and a linear shape are provided in each of the land sections and arranged to extend substantially along the tire widthwise direction. The sipes are shaped like narrow grooves having a thickness of 0.2 to 0.6 mm and a depth of 4 to 10 mm Due to the dimensions just mentioned, the sipes can be distinguished from the circumferential main grooves 32a, 34a, 32b, and 34b, the first lug grooves 36a and 36b, the second lug grooves 38a and 38b, the notched grooves 40a and 40b, and the center lug grooves 42a and 42b.

Figure 3:
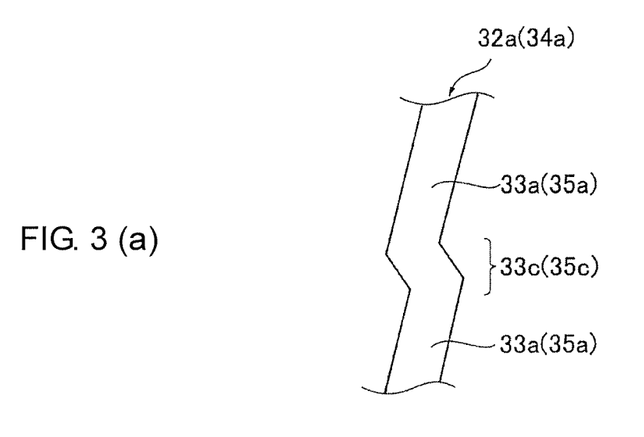
FIGS. 3(a) and 3(b) illustrate the circumferential main groove shown in FIG. 2 in more detail.

FIGS. 3 (a) and (b) illustrate the circumferential main grooves 32a, 34a, 32b, and 34b in more detail. As shown in FIGS. 3 (a) and (b), each of the circumferential main grooves 32a, 34a, 32b, and 34b is configured to have a zigzag shape such that a groove center position varies in the tire widthwise direction. Each of the circumferential main grooves 32a, 34a, 32b, and 34b includes first slanted main grooves 33a, 35a, 33b, or 35b that extend at a first slant angle with respect to the tire circumferential direction and second slanted main grooves 33c, 35c, 33d, or 35d that extend at a second slant angle larger than the first slant angle with respect to the tire circumferential direction and have a shorter groove length than the first slanted grooves 33a, 35a, 33b, or 35b. A plurality of pairs of the slanted main grooves each comprising a first slanted main groove 33a, 35a, 33b, or 35b and a corresponding second slanted main groove 33c, 35c, 33d, or 35d are arranged such that each of the circumferential main grooves 32a, 34a, 32b, and 34b exhibits a zigzag shape as it extends in the tire circumferential direction.

On tire-widthwise opposite sides of the tire centerline CL corresponding to a center of the tread section, the first lug grooves 36a and 36b extend from the first slanted main grooves 33a and 33b of the inside circumferential main grooves 32a and 32b, which are the two circumferential main grooves that are closer to the tire centerline CL on each side. The first lug grooves 36a and 36b extend at a larger slant angle than the first slanted main grooves 33a and 33b with respect to the tire circumferential direction and in a direction opposite the tire rotation direction. Along the way, the slant angle of the first lug grooves 36a and 36b becomes even larger and the first lug grooves 36a and 36b reach the pattern ends Ea and Eb. A plurality of the first lug grooves 36a and 36b are provided along the tire circumferential direction. On tire-widthwise opposite sides of the tire centerline CL corresponding to the center of the tread section, the second lug grooves 38a and 38b extend toward the pattern ends Ea and Eb from the outside circumferential main grooves 34a and 34b, which are the two circumferential main grooves that are arranged more toward the outside in the tire widthwise direction. A plurality of the second lug grooves 38a and 38b are provided along the tire circumferential direction. Additionally, one of the second lug grooves 38a is arranged between two of the first lug grooves 36a that are adjacent to each other along the tire circumferential direction, and one of the second lug grooves 38b is arranged between two of the first lug grooves 36b that are adjacent to each other along the tire circumferential direction. Although in this embodiment one second lug groove 38a is arranged between two adjacent first lug grooves 36a and one second lug groove 38b is arranged between two adjacent first lug grooves 36b, it is acceptable to arrange two or three second lug grooves 38a and 38b. By arranging two or three second lug grooves 38a and 38b, a tire widthwise edge component can be increased in the shoulder regions of the tread section and the braking performance on snow covered road surfaces can be improved. If four or more second lug grooves are arranged, then the block rigidity in the shoulder regions will decline and the braking performance on snow covered road surfaces will decline. In the tread pattern 30, the first lug grooves 36a and the second lug grooves 38a in the region of the tread section located on one side of the tire centerline CL are slanted in a different direction with respect to the tire circumferential direction than the first lug grooves 36b and the second lug grooves 38b in the region located on the other side of the centerline CL.

Figure 4:
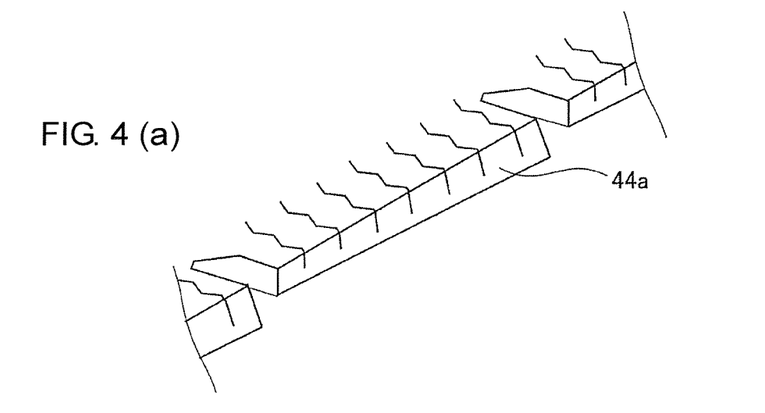
FIGS. 4(a) to 4(c) illustrate the groove-wall-angle varying wall surface provided in the inside circumferential main groove shown in FIG. 2.

The center lug grooves 42a are provided in the inside circumferential main groove 32a and arranged along the tire circumferential direction, and the center lug grooves 42b provided in the inside circumferential main groove 32b and arranged along the tire circumferential direction. Groove-wall-angle varying wall surfaces 44a are included in portions of the side wall of the tire centerline CL side of the inside circumferential main groove 32a corresponding to sidewalls of the first slanted main grooves 33a that make up part of the zigzag shape of the inside circumferential main groove 32a, and groove-wall-angle varying wall surfaces 44b are included in portions of the side wall of the tire centerline CL side of the inside circumferential main groove 32b corresponding to the first slanted main grooves 33b that make up part of the zigzag shape of the inside circumferential main groove 32b. The groove-wall-angle varying wall surfaces 44a and 44b are configured such that a groove wall angle of the wall surface with respect to a tire radial direction varies from a smaller angle to a larger angle as one moves in a tire circumferential direction from one end portion of the first slanted main grooves 33a and 33b (the end portion that contacts the ground sooner when the tire 10 rotates) to the other end portion (the end portion that contacts the ground later when the tire 10 rotates). That is, the groove-wall-angle varying wall surfaces 44a are provided between tire-circumferentially adjacent center lug grooves 42a on the walls of the first slanted main grooves 33a that are located closer to the tire centerline CL, and the groove-wall-angle varying wall surfaces 44b are provided between tire-circumferentially adjacent center lug grooves 42b on the walls of the first slanted main grooves 33b that are located closer to the tire centerline CL. Since the groove-wall-angle varying wall surfaces 44a and the groove-wall-angle varying wall surfaces 44b have the same constituent features, the groove-wall-angle varying wall surfaces 44a are explained representatively and an explanation of the groove-wall-angle varying wall surfaces 44b is omitted. FIGS. 4(a) to 4(c) illustrate a groove-wall-angle varying wall surface 44a. FIG. 4(b) is a sectional view of the inside circumferential main groove 32a taken along a section line A-A shown in FIG. 2, and FIG. 4(c) is a sectional view of the inside circumferential main groove 32a taken along a section line B-B shown in FIG. 2. As shown in FIGS. 4(b) and 4(c), as one moves from one end portion to the other end portion of a first slanted main groove 33a forming a portion of the inside circumferential main groove 32a, the groove wall angle with respect to the tire radial direction changes from an angle $\theta_1$ to an angle $\theta_2$ that is larger than $\theta_1$. As explained previously, the tread pattern 30 has a designated tire rotation direction and, therefore, a groove area of the first slanted main groove 33a is gradually reduced. Providing a groove-wall-angle varying wall surface 44a on the first slanted main groove 33a in this manner gradually narrows a groove area related to the first slanted main groove 33a that enters a ground contact surface as the tire 10 rotates on a snow covered road surface. As a result, snow contained inside the first slanted main groove 33a is gradually packed harder and a snow column shear force increases, thereby improving a braking performance on snow covered road surfaces.

Each of the outside land sections 46a is demarcated by the inside circumferential main groove 32a, the outside circumferential groove 34a, and two of the first lug grooves 36a arranged adjacent to each other in the tire circumferential direction, and each of the outside land sections 46b is demarcated by the inside circumferential main groove 32b, the outside circumferential groove 34b, and two of the first lug grooves 36b arranged adjacent to each other in the tire circumferential direction. The outside land sections 46a and 46b are portions that contact the ground surface. Each of the outside land sections 46a and 46b is positioned in the tire circumferential direction such that it faces opposite a portion of one of the groove-wall-angle varying wall surfaces 44a with the inside circumferential groove 32a or 32b disposed in-between. Each of the outside land sections 46a is provided with a notched lug groove 40a that extends in a tire widthwise direction from the outside circumferential main groove 34a and closes in a region within the outside land section 46a, and each of the outside land sections 46b is provided with a notched lug groove 40b that extends in a tire widthwise direction from the outside circumferential main groove 34b and closes in a region within the outside land section 46b. Although in this embodiment the notched lug grooves 40a and 40b extend into regions of the outside land sections 46a and 46b from the outside circumferential main grooves 34a and 34b, it is also acceptable for the notched lug grooves 40a and 40b to extend into regions of the outside land sections 46a and 46b from the inside circumferential main grooves 32a and 32b. A groove depth of the notched lug grooves 40a and 40b is shallower than a groove depth of the first lug grooves 36a and 36b where they pass by adjacently to the outside land sections 46a and 46b and shallower than a groove depth of the second lug grooves 38a and 38b where they extend from the outside circumferential main grooves 34a and 34b.

Reasons will now be explained as to why the groove depth of the notched lug grooves 40a and 40b is made shallower than a groove depth of the first lug grooves 36a and 36b where they pass by adjacent to the outside land sections 46a and 46b and shallower than a groove depth of the second lug grooves 38a and 38b where they extend from the outside circumferential main grooves 34a and 34b. As explained previously, providing groove-wall-angle varying wall surfaces 44a and 44b on the first slanted main grooves 33a and 33b increases a snow column shear force of snow chunks inside the first slanted main grooves 33a and 33b and, thereby, improves a braking performance on snow covered road surfaces. Making the depths of the notch lug grooves 40a and 40b shallower as explained above serves to prevent the block rigidity of the outside land sections 46a and 46b, which adjoin the first slanted main grooves 33a and 33b, from declining. Thus, making the depths of the notch lug grooves 40a and 40b shallower prevents the outside land sections 46a and 46b from deforming easily and causing the snow shear forces of snow chucks hardened inside the first slanted main grooves 33a and 33b from declining. With such a tread pattern 30, as will be explained later, one of the braking performance on snow covered road surfaces and the braking performance on damp road surfaces (wet road surfaces) can be improved while at least maintaining the other. Also, providing the notched lug grooves 40a and 40b enables a contact pressure exerted between the outside land sections 46a and 46b and the ground surface can be increased such that the braking performance on damp road surfaces (wet road surfaces) can be improved.

Also, from the standpoint of improving one of the braking performance on snow covered road surfaces and the braking performance on damp road surfaces (wet road surfaces) while at least maintaining the other, it is preferable for the notched lug grooves 40a and 40b to extend toward the tire centerline CL from the outside circumferential main grooves 34a and 34b and for the closed ends of the notched lug grooves 40a and 40b to be positioned within 50% of a tire widthwise width of the outside land sections 46a and 46b from the open ends of the notched lug grooves 40a and 40b at the outside circumferential main grooves 34a and 34b. From the standpoint of improving one of the braking performance on snow covered road surfaces and the braking performance on damp road surfaces (wet road surfaces) while at least maintaining the other, it is preferable for a groove width of the first lug grooves 36a and 36b to be 1.2 to 2.5 times larger than a groove width of the second lug grooves 38a and 38b and for a groove depth of the second lug grooves 38a and 38b at positions where the second lug grooves 38a and 38b extend from the outside circumferential main grooves 34a and 34b to be shallower than a groove depth of the first lug grooves 36a and 36b at positions where the first lug grooves 36a and 36b intersect the outside circumferential main grooves 34a and 34b. Making the groove width of the first lug grooves 36a and 36b have a ratio of 1.2 to 2.5 with respect to the groove width of the second lug grooves 38a and 38b enables an appropriate groove area to be secured in the shoulder regions of the tread section positioned to the outsides of the circumferential main grooves 32b and 34b in the tire widthwise directions. If the ratio is smaller than 1.2, then the groove surface area in the shoulder regions will be insufficient and the braking performance on damp road surfaces (wet road surfaces) will not improve. If the ratio is larger than 2.5, then the block rigidity of the shoulder regions will decline. The ratio is preferably 1.7 to 2.0. Making the groove depth of the second lug grooves 38a and 38b at positions where the second lug grooves 38a and 38b extend from the outside circumferential main grooves 34a and 34b shallower than a groove depth of the first lug grooves 36a and 36b at positions where the first lug grooves 36a and 36b intersect the outside circumferential main grooves 34a and 34b serves to prevent the block rigidity of the shoulder regions from declining and improves the braking performance on damp road surfaces (wet road surfaces). It is preferable for the aforementioned groove depth of the second lug grooves 38a and 38b to be set to 60 to 70% of the aforementioned groove depth of the first lug grooves 36a and 36b.

It is also preferable for a snow traction index STI defined by the equation shown below to be equal to or larger than 180 and smaller than or equal to 220

$$STI=-6.8+2202\times\rho_g+672\times\rho_s+7.6\times D_g \quad (1)$$

(where $\rho_g$ is a value obtained by dividing a total length (mm) of all the grooves provided on the pneumatic tire as viewed when the grooves are projected in a tire widthwise direction by a product (mm$^2$) of a ground contact width and circumferential length, $\rho_s$ is a value obtained by dividing a total length (mm) of all the sipes provided on the pneumatic tire as viewed when the sipes are projected in a tire widthwise direction by the product (mm$^2$) of a ground contact width and circumferential length, and Dg is an average depth (mm) of the grooves. As explained in Japanese Patent Publication Number 2824675, the snow traction index is a quantitative index related to the sipes and grooves provided in a tread pattern to improve a motion performance on icy road surfaces without damaging a motion performance on snow covered road surfaces; the higher the value of the snow traction index is, the more the motion performance on icy road surfaces can be improved without damaging a motion performance on snow covered road surfaces. It is preferable for a slant angle of the first lug grooves 36a and 36b with respect to the tire widthwise direction to be 20 to 50 degrees in a region where the first lug grooves 36a and 36b pass between the outside land sections 46a and 46b, and it is preferable for a slant angle of the first lug grooves 36a and 36b with respect to the tire widthwise direction to be 0 to 20 degrees in a region between the outside circumferential main grooves 34a and 34b and the pattern ends $E_a$ and $E_b$. The slant angle of the first lug grooves 36a and 36b is defined to be an angle that a curve corresponding a groove center position of the first lug groove 36a or 36b makes with respect to the tire widthwise direction. In the tread pattern 30, the circumferential main grooves 32a, 34a, 32b, and 34b have zigzag shapes and the first lug grooves 36a and 36b are provided, respectively, such that they communicate with the circumferential main grooves 32a and 34a and the circumferential main grooves 32b and 34b and extend to the pattern ends Ea and Eb. As a result, one of the braking performance on snow covered road surfaces and the braking performance on wet road surfaces can be improved while the other is at least maintained. Also, since the first lug grooves 36a and 36b extend to the pattern ends $E_a$ and $E_b$, a drainage performance (anti-hydroplaning performance) can be improved in addition to the braking performance on damp road surfaces (wet road surfaces). By providing block-shaped outside land sections 46a demarcated by the circumferential main grooves 32a and 34a and the first lug grooves 36a and block-shaped outside land sections 46b demarcated by the circumferential main grooves 32b and 34b and the first lug grooves 36b, a steering stability performance on dry road surfaces can be ensured in addition to improving the braking performance on snow covered road surfaces and the braking performance on damp road surfaces (wet road surfaces).

In order to investigate the effects of a tire 10 according to the embodiment, tires were fabricated according to various specifications. The tire size of the fabricated tires is 205/55R16. The fabricated tires were installed on rims having the rim size 16×61/2J and inflated to an air pressure of 230 kPa. The braking performance (wet braking performance) on damp road surfaces (wet road surfaces) and the braking performance (snow braking performance) on snow covered road surfaces (snow braking performance) were evaluated.

For the wet braking performance, tires of the same specification were installed on a 2-liter class passenger car and the passenger car was driven at 100 km/hour on a road surface having a water film with a water depth of 10 mm. Five times, the passenger car was braked fully and the baking distance was measured. The tire load conditions were set to the condition of two passengers riding in the front seats of the passenger car. An average value of the measured braking distances was used as a measurement value. The measurement values of the different tires evaluated were expressed in terms of an index defined such that the measurement value of a prior art example (explained later) has an index value of 100. The higher the index value is, the shorter the braking distance is and the higher the indicated wet braking performance is. For the snow braking performance, tires of the same specification were installed on a 2-liter class passenger car and the passenger car was driven at 40 km/hour on a test course having a snow covered road surface. Five times, the passenger car was braked fully and the baking distance was measured. The tire load conditions were set to the condition of two passengers riding in the front seats of the passenger car. An average value of the measured braking distances was used as a measurement value. The measurement values of the different tires evaluated were expressed in terms of an index defined such that the measurement value of a prior art example (explained later) has an index value of 100. The higher the index value is, the shorter the braking distance is and the higher the indicated snow braking performance is.

Table 1 below shows the different specifications of tire and the performance evaluation results. In the prior art example, the circumferential main grooves 32a, 32b, 34a, and 34b are straight instead of zigzagged and notched lug grooves 40a and 40b are not provided. In Comparative Example 1, the circumferential main grooves 32a, 32b, 34a, 34b have zigzag shapes and notched lug grooves 40a and 40b are provided, but the groove depths of the notched lug grooves 40a and 40b are deeper than in Working Examples 1 to 4 and the same as the groove depth at the positions where the second lug grooves 38a and 38b start to extend from the outside circumferential main grooves 34a and 34b. In Comparative Example 2, the circumferential main grooves 32a, 32b, 34a, and 34b have a zigzag shape and notched lug grooves 40a and 40b are not provided. In Working Examples 1 to 4, the lengths of the notched lug grooves 40a and 40b are varied. That is, the positions of the closed ends of the notched lug grooves 40a and 40b from the open ends of the notched lug grooves 40a and 40b are varied among distances between 30 and 70% of a tire widthwise width of the outside land sections 46a and 46b.

TABLE 1

|  | Working Example 1 | Working Example 2 | Working Example 3 | Working Example 4 | Comparative Example 1 | Comparative Example 2 | Prior Art Example |
|---|---|---|---|---|---|---|---|
| Circumferential main groove | Zigzag shape | ← | ← | ← | ← | ← | Linear shape |
| Groove width of first lug groove/groove width of second lug groove | 1.8 | ← | ← | ← | ← | ← | 1 |
| Groove depth of second lug groove/groove depth of first lug groove | 0.6 | ← | ← | ← | ← | ← | 1 |
| Existence of notched lug groove | Yes | ← | ← | ← | ← | No | No |
| Groove depth (mm) of notched lug grooves | 5 | ← | ← | ← | 6 | — | — |
| Position (%) of closed end of notched lug grooves | 50 | 40 | 30 | 70 | 50 | — | — |
| STI | 200 | 198 | 196 | 204 | 200 | 175 | 160 |
| Groove angle of first lug grooves (near center/near shoulder) | 45 deg/ 10 deg | ← | ← | ← | ← | ← | ← |
| Wet braking performance | 100 | 101 | 101 | 100 | 97 | 100 | 100 |
| Snow braking performance | 110 | 108 | 105 | 103 | 110 | 102 | 100 |

As is clear by comparing Working Example 1, Comparative Example 1, Comparative Example 2, and the prior art example in Table 1, Working Example 1 improves the snow braking performance while maintaining the wet braking performance. As a result, one can see that the tread pattern 30 of the tire 10 improves the snow braking performance while maintaining the wet braking performance. By comparing the Working Examples 1 to 4, it can be seen that from the standpoint of improving the snow braking performance while maintaining the braking performance, it is preferable for the closed ends of the notched lug grooves 40a and 40b to be positioned within 50% (more specifically, 30 to 50%) of a tire widthwise width of the outside land sections 46a and 46b from the open ends of the notched lug grooves 40a and 40b at the outside circumferential main grooves 34a and 34b.

A portion of the improvement to the snow braking performance can be allocated to contribute to improving the wet braking performance by adopting such measures as widening the first lug grooves 36a and 36b so as to increase a ratio of the groove width of the first lug grooves 36a and 36b with respect to the groove width of the second lug grooves 38a and 38b or increasing the groove volume of the circumferential main grooves 32a, 32b, 34a, and 34b. In this way, one of the wet braking performance and the snow braking performance can improved while maintaining the other.

Although a pneumatic tire according to the present invention has been explained in detail, the present invention is not limited to the previously explained embodiment and various improvements and modifications can clearly be made without departing from the scope of the invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire having a tread pattern in a tread section, wherein in each of two regions disposed on opposite sides of a tire centerline in the tread section, the tread pattern includes:
   two circumferential main grooves that are provided side-by-side along a tire widthwise direction of the tire and configured to extend along a tire circumferential direction of the tire in a zigzag shape such that they are slanted at a slant angle with respect to the tire circumferential direction and exhibit a position variation in a widthwise direction of the tire;
   a plurality of first lug grooves that are arranged along the tire circumferential direction and configured to extend from an inner circumferential main groove, which is the circumferential main groove of the two circumferential main grooves that is located closer to the tire centerline, and each of the first lug grooves being slanted with respect to the tire circumferential direction, with an angle at an intermediate portion of each of the first lug grooves being larger than another angle at a portion of each of the first lug grooves other than the intermediate portion, and reaching a pattern end of the tread pattern; and
   a plurality of second lug grooves that are arranged along the tire circumferential direction, and configured to extend toward the pattern end from an outer circumferential main groove, which is the circumferential main groove of the two circumferential main grooves that is located more toward an outside of the pneumatic tire in a tire widthwise direction, and at least one of the second lug grooves is arranged between two of the first lug grooves that are adjacent to each other along the tire circumferential direction;
   a side wall of the inner circumferential main groove that is located closer to the tire centerline including a groove-wall-angle varying wall surface configured such that a groove wall angle with respect to a tire radial direction increases in the tire circumferential direction;
   an outside land section that is demarcated by the inner circumferential groove, the outer circumferential groove, and two of the first lug grooves arranged adjacent to each other in the tire circumferential direction being positioned facing opposite a portion of the groove-wall-angle varying wall surface with the inner circumferential groove disposed in-between, the outside land section including a notched lug groove that extends in the tire widthwise direction from either the inner circumferential main groove or the outer circumferential main groove and closes in a region within the outside land section;
   a groove depth of the notched lug groove is shallower than a groove depth of the first lug grooves where they pass by adjacently to the outside land section and shallower than a groove depth of the second lug grooves where they extend from the outer circumferential main groove;
   a groove width of the first lug grooves is 1.2 to 2.5 times larger than a groove width of the second lug grooves; and
   a groove depth of the second lug grooves at positions where the second lug grooves extend from the outer circumferential main groove is shallower than a groove depth of the first lug grooves at positions where the first lug grooves intersect the outer circumferential main groove.

2. The pneumatic tire according to claim 1, wherein the notched lug groove extends toward the tire centerline from the outer circumferential main groove and the closed end of the notched lug groove is positioned within 50% of a tire widthwise width of the outside land section from an open end of the notched lug groove at the outer circumferential main groove.

3. A pneumatic tire according to claim 2, configured such that a snow traction index STI defined by the equation (1) below is equal to or larger than 180 and smaller than or equal to 220

$$STI = -6.8 + 2202 \times \rho_g + 672 \times \rho_s + 7.6 \times D_g \quad (1)$$

where $\rho_g$ is a value obtained by dividing a total length of all of the grooves on the pneumatic tire as viewed when the grooves are projected in the tire widthwise direction by a product of a ground contact width and a circumferential length, $\rho_s$ is a value obtained by dividing a total length of all sipes on the pneumatic tire as viewed when the sipes are projected in the tire widthwise direction by the product of the ground contact width and the circumferential length, and Dg is an average depth of the grooves.

4. The pneumatic tire according to claim 2, wherein two or three of the second lug grooves are arranged between two of the first lug grooves that are adjacent to each other along the tire circumferential direction.

5. The pneumatic tire according to claim 2, wherein the first lug grooves and the second lug grooves in a region of the tread section located on one side of the tire centerline are slanted in a different direction with respect to the tire circumferential direction than the first lug grooves and the second lug grooves in a region of the tread section located on an other side of the tire centerline opposite to the one side of the tire centerline.

6. The pneumatic tire according to claim 2, wherein a slant angle of the first lug grooves with respect to the tire widthwise direction is 20 to 50 degrees in a region where the first lug grooves pass adjacently to the outside land section, and a slant angle of the first lug grooves with respect to the tire widthwise direction is 0 to 20 degrees in a region between the outside circumferential main groove and the pattern end.

7. A pneumatic tire according to claim 1, configured such that a snow traction index STI defined by the equation (1) below is equal to or larger than 180 and smaller than or equal to 220

$$STI = -6.8 + 2202 \times \rho_g + 672 \times \rho_s + 7.6 \times D_g \quad (1)$$

where $\rho_g$ is a value obtained by dividing a total length of all of the grooves on the pneumatic tire as viewed when the grooves are projected in the tire widthwise direction by a product of a ground contact width and a circumferential length, $\rho_s$ is a value obtained by dividing a total length of all sipes on the pneumatic tire as viewed when the sipes are projected in the tire widthwise direction by the product of the ground contact width and the circumferential length, and Dg is an average depth of the grooves.

8. The pneumatic tire according to claim 7, wherein two or three of the second lug grooves are arranged between two of the first lug grooves that are adjacent to each other along the tire circumferential direction.

9. The pneumatic tire according to claim 7, wherein the first lug grooves and the second lug grooves in a region of the tread section located on one side of the tire centerline are slanted in a different direction with respect to the tire circumferential direction than the first lug grooves and the second lug grooves in a region of the tread section located on an other side of the tire centerline opposite to the one side of the tire centerline.

10. The pneumatic tire according to claim 7, wherein a slant angle of the first lug grooves with respect to the tire widthwise direction is 20 to 50 degrees in a region where the first lug grooves pass adjacently to the outside land section, and a slant angle of the first lug grooves with respect to the tire widthwise direction is 0 to 20 degrees in a region between the outside circumferential main groove and the pattern end.

11. The pneumatic tire according to claim 1, wherein two or three of the second lug grooves are arranged between two of the first lug grooves that are adjacent to each other along the tire circumferential direction.

12. The pneumatic tire according to claim 11, wherein the first lug grooves and the second lug grooves in a region of the tread section located on one side of the tire centerline are slanted in a different direction with respect to the tire circumferential direction than the first lug grooves and the second lug grooves in a region of the tread section located on an other side of the tire centerline opposite to the one side of the tire centerline.

13. The pneumatic tire according to claim 1, wherein the first lug grooves and the second lug grooves in a region of the tread section located on one side of the tire centerline are slanted in a different direction with respect to the tire circumferential direction than the first lug grooves and the second lug grooves in a region of the tread section located on an other side of the tire centerline opposite to the one side of the tire centerline.

14. The pneumatic tire according to claim 1, wherein a slant angle of the first lug grooves with respect to the tire widthwise direction is 20 to 50 degrees in a region where the first lug grooves pass adjacently to the outside land section, and a slant angle of the first lug grooves with respect to the tire widthwise direction is 0 to 20 degrees in a region between the outside circumferential main groove and the pattern end.

* * * * *